United States Patent
Cao

(10) Patent No.: US 9,918,273 B2
(45) Date of Patent: *Mar. 13, 2018

(54) NETWORK ACCESS METHOD, MOBILE COMMUNICATION TERMINAL, NETWORK SERVER, AND NETWORK ACCESS SYSTEM

(71) Applicant: Guangdong Oppo Mobile Telecommunications Corp., Ltd., Dongguan, Guangdong (CN)

(72) Inventor: Jun Cao, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,330

(22) Filed: Jul. 7, 2017

(65) Prior Publication Data

US 2017/0311246 A1 Oct. 26, 2017

Related U.S. Application Data

(63) Continuation of application No. 15/486,014, filed on Apr. 12, 2017, which is a continuation of application No. PCT/CN2016/084363, filed on Jun. 1, 2016.

(30) Foreign Application Priority Data

Jun. 19, 2015 (CN) .......................... 2015 1 0346888

(51) Int. Cl.
*H04W 48/18* (2009.01)
*H04W 60/00* (2009.01)
*H04B 17/318* (2015.01)

(52) U.S. Cl.
CPC ........... *H04W 48/18* (2013.01); *H04B 17/318* (2015.01); *H04W 60/00* (2013.01)

(58) Field of Classification Search
CPC ..... H04W 48/18; H04W 48/20; H04W 60/00; H04W 8/02; H04W 8/04; H04W 8/06
See application file for complete search history.

(56) References Cited

U.S. PATENT DOCUMENTS

| 2005/0094593 A1 | 5/2005 | Buckley |
| 2006/0160532 A1 | 7/2006 | Buckley et al. |

(Continued)

FOREIGN PATENT DOCUMENTS

| CN | 1968502 A | 5/2007 |
| CN | 104853404 A | 8/2015 |

(Continued)

OTHER PUBLICATIONS

Huawei et al., "The MDT Applicability of Equivalent PLMN Identities", 3GPP TSG-RAN WG3 Meeting #73, R3-111912, Aug. 22-26, 2011, 4 pgs.

*Primary Examiner* — Jean Gelin
(74) *Attorney, Agent, or Firm* — Young Basile Hanlon & MacFarlane, P.C.

(57) ABSTRACT

Provided are a network access method, a mobile communication terminal, a network server, and a network access system. The network access method includes the follows. A mobile communication terminal accesses a wireless local area network of a place of visit. The mobile communication terminal sends a network ID acquisition request to a network server of the wireless local area network. The mobile communication terminal receives at least one PLMN network ID unicast or broadcast by the network server in response to the network ID acquisition request, and adds the received at least one PLMN network ID to an equivalent home public land mobile network (EHPLMN) list; the at least one PLMN network ID comprises network IDs of PLMNs of visited operators who have contracted with a home operator of the mobile communication terminal. The (Continued)

mobile communication terminal performs network access in the place of visit based on the EHPLMN list.

6 Claims, 8 Drawing Sheets

(56) References Cited

U.S. PATENT DOCUMENTS

| | | |
|---|---|---|
| 2009/0046682 A1* | 2/2009 | Kim ................ H04W 28/06 370/338 |
| 2009/0170507 A1 | 7/2009 | Kim |
| 2012/0202492 A1 | 8/2012 | Moisanen |
| 2013/0073320 A1 | 3/2013 | Delarme |
| 2013/0077515 A1 | 3/2013 | Jung et al. |
| 2013/0109377 A1 | 5/2013 | Al-Khudairi et al. |
| 2013/0208644 A1* | 8/2013 | Jung ................ H04W 4/08 370/312 |
| 2014/0003350 A1 | 1/2014 | Liu et al. |
| 2014/0031033 A1 | 1/2014 | Juang et al. |
| 2014/0073320 A1 | 3/2014 | Dhanda et al. |
| 2014/0213319 A1 | 7/2014 | Gibbons |
| 2014/0348064 A1 | 11/2014 | Jeong et al. |
| 2015/0043534 A1 | 2/2015 | Shirota et al. |
| 2015/0109636 A1* | 4/2015 | Tanaka ............... H04N 1/00344 358/1.15 |
| 2015/0117425 A1 | 4/2015 | Gupta |
| 2015/0215849 A1* | 7/2015 | Patel .................... H04W 48/16 455/435.2 |
| 2015/0319627 A1* | 11/2015 | Jung .................... H04W 48/20 370/328 |
| 2015/0334644 A1 | 11/2015 | Kim et al. |
| 2016/0007187 A1 | 1/2016 | Liao |
| 2016/0219428 A1 | 7/2016 | Noldus et al. |

FOREIGN PATENT DOCUMENTS

| | | |
|---|---|---|
| CN | 104853412 A | 8/2015 |
| CN | 104853413 A | 8/2015 |
| CN | 104902459 A | 9/2015 |
| CN | 104902460 A | 9/2015 |
| CN | 104980993 A | 10/2015 |
| CN | 104980997 A | 10/2015 |
| EP | 1968339 A1 | 9/2008 |
| WO | 2007081123 A1 | 7/2007 |
| WO | 2014172867 A1 | 10/2014 |

* cited by examiner

NETWORK ACCESS METHOD, MOBILE COMMUNICATION TERMINAL, NETWORK SERVER, AND NETWORK ACCESS SYSTEM

CROSS-REFERENCE TO RELATED APPLICATION(S)

This application is a continuation of U.S. application Ser. No. 15/486,014, filed on Apr. 12, 2017, which is a continuation of International Application No. PCT/CN2016/084363, filed on Jun. 1, 2016, which claims priority to Chinese Patent Application No. 201510346888.9, filed on Jun. 19, 2015, the contents of all of which are herein incorporated by reference in their entireties.

TECHNICAL FIELD

The present disclosure relates to communication technology field, and particularly to a network access method, a mobile communication terminal, a network server, and a network access system.

BACKGROUND

Public Land Mobile Network (PLMN) is a network established and operated by governments and approved operators for providing the public with land mobile communication business. The PLMN is generally interconnected with a public switched telephone network to form a communication network of the whole region or country.

When a mobile communication terminal moves from the home to a place of visit (for example, the mobile communication terminal roams from the home country to a visited country), the mobile communication terminal needs to access a visited PLMN ("VPLMN" for short) of the place of visit. However, since relevant information of the PLMN of the place of visit is not stored, the mobile communication terminal has to attempt to connect one by one in the searched VPLMN list; for example, the mobile communication terminal can first attempt to connect to a VPLMN and when rejected, attempt to connect to another VPLMN, until connected successfully. This causes the mobile communication terminal to take a long time (and sometimes, it may even need to wait for more than a few minutes) to successfully access the PLMN of the place of visit, which affects the user's communication experience.

BRIEF DESCRIPTION OF THE DRAWINGS

In order to more clearly illustrate the technical solutions of the implementations of the present disclosure, the drawings used in the description of the implementations will be briefly described, it will be apparent that the drawings described in the following are implementations of the present disclosure, and it will be apparent to those skilled in the art that other drawings may be obtained from the drawings without any creative efforts.

DETAILED DESCRIPTION

Figure 1:
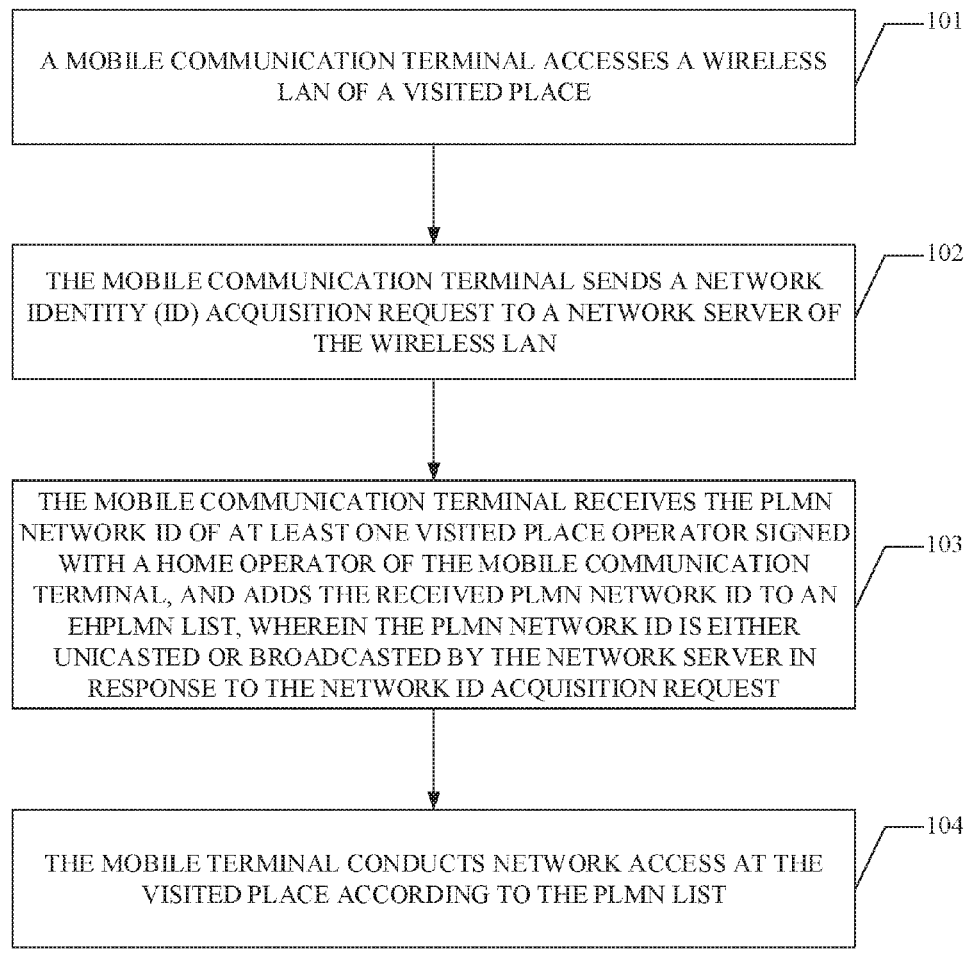
FIG. 1 is a flow diagram illustrating one implementation of a network access method provided in an implementation of the present disclosure.

Technical solutions of the present disclosure will be described clearly and completely with reference to the accompanying drawings; obviously, implementations described below are merely part of rather than all of the implementations of the present disclosure. Based on the implementations of the present disclosure, other implementations obtained there from without any creative work by those of ordinary skill in the art shall fall into the protection scope of the present disclosure.

It is to be noted that the terminology used in the implementations of the present disclosure is for the purpose of describing particular implementations only and is not intended to limit the disclosure. The singular forms of "a", "the", or "this" used in the implementations of the disclosure and the appended claims are also intended to include the majority unless the context clearly dictates otherwise. It should also be understood that the term "and/or" used herein refers to and encompasses any or all of the possible combinations of one or more associated listed items.

In the implementations of the present disclosure, the mobile communication terminal includes but is not limited to a terminal having a communication function such as a mobile phone, a watch, or a tablet. A Public Land Mobile Network (PLMN) can include the follows.

Registered PLMN ("RPLMN" for short): a PLMN for a mobile communication terminal registered before the last shutdown or off-line.

Equivalent PLMN ("EPLMN" for short): a PLMN with the same priority as a PLMN currently selected by the mobile communication terminal.

Equivalent Home PLMN ("EHPLMN" for short): a PLMN equivalent to a PLMN currently selected by the mobile communication terminal.

Home PLMN ("HPLMN" for short): a PLMN of the home of the mobile communication terminal. For a certain user, there is only one HPLMN. Generally, when the mobile communication terminal searches networks, it searches networks in the EHPLMN list or the HPLMN list first.

Visited PLMN ("VPLMN" for short): a PLMN of a place of visit of the mobile communication terminal.

According to an implementation of the present disclosure, there is provided a method of accessing a network. The method includes the follows.

A mobile communication terminal accesses a wireless local area network of a place of visit. The mobile communication terminal send a network identity (ID) acquisition request to a network server of the wireless local area network. The mobile communication terminal receives at least one public land mobile network (PLMN) network ID unicast or broadcast by the network server in response to the network ID acquisition request, and adds the received at least one PLMN network ID to an equivalent home public land mobile network (EHPLMN) list; the at least one PLMN network ID comprises network IDs of PLMNs of visited operators who have contracted with a home operator of the mobile communication terminal. The mobile communication terminal performs network access in the place of visit based on the EHPLMN list.

The process that the mobile communication terminal performs the network access at the place of visit based on the EHPLMN list includes the follows. The mobile communication terminal search for a visited public land mobile network (VPLMN). The mobile communication terminal compares network IDs included in the EHPLMN list against the network ID of the VPLMN; and if there is a network ID in the EHPLMN list which matches that of the VPLMN, the mobile communication terminal initiates a network registration to the network corresponding to the matching network ID.

The method can further include the follows. The mobile communication terminal stores home of operators who have contracted with the home operator and IDs of the contracted operators. The mobile communication terminal determines the ID of the visited operator contracted with the home operator, based on the place of visit, the pre-stored home of the operators contracted with the home operator, and the IDs of the contracted operators. The network ID acquisition request sent by the mobile communication terminal to the network server of the wireless local area network carries the ID of the visited operator contracted with the home operator.

According to another aspect of the present disclosure, there is provided a method of accessing a network implemented by a network server, which include the follows. A network identity (ID) acquisition request is received from a first mobile communication terminal sent through a wireless local area network. The network ID acquisition request is broadcast in the local area network if no public land mobile network (PLMN) network ID of a local operator has been stored. The PLMN network ID of the local operator sent from a second mobile communication terminal is received, the PLMN network ID of the local operator includes a PLMN network ID of the local operator who has contracted with the home operator of the mobile communication terminal. The PLMN network ID of the local operator is unicast to the first mobile communication terminal is broadcast within the local area network; the PLMN network ID of the local operator is used for network access of the first mobile communication terminal.

The method can further include the follows. The PLMN network ID of the local operator is unicast to the first mobile communication terminal if the PLMN network ID of the local operator has been stored.

According to another implementation of the present disclosure, there is provided a terminal. The terminal includes: a local area network access unit, configured to access a wireless local area network of a place of visit; a requesting unit, configured to send a network identity (ID) acquisition request to a network server of the wireless local area network; a receiving unit, configured to receive at least one public land mobile network (PLMN) network ID unicast or broadcast by the network server in response to the network ID acquisition request, and add the received at least one PLMN network ID to an equivalent home public land mobile network (EHPLMN) list, wherein the at least one PLMN network ID comprises network IDs of PLMNs of visited operators who have contracted with a home operator of the mobile communication terminal; a network access unit, configured to perform network access in the place of visit based on the EHPLMN list.

In one implementation, the network access unit may include: a network searching sub-unit, configured to search for a visited public land mobile network (VPLMN); a comparing sub-unit, configured to compare the network IDs included in the EHPLMN list against the network ID of the VPLMN; a network registration sub-unit, configured to, if there is a network ID in the EHPLMN list which matches that of the VPLMN, initiate a network registration onto the network corresponding to the matching network ID.

In one implementation, the terminal further includes: a storage unit, configured to store, in advance, home of operators who have contracted with the home operator and IDs of the contracted operators; a determining unit, configured to determine the ID of the visited operator contracted with the home operator, based on the place of visit, the pre-stored home of the operators contracted with the home operator, and the IDs of the contracted operators.

The network ID acquisition request sent by the requesting unit to the network server of the wireless local area network carries the ID of the visited operator who has contracted with the home operator.

According to another implementation of the present disclosure, there is provided a network server, which includes: a first receiving unit, configured to receive a network identity (ID) acquisition request from a first mobile communication terminal sent through a wireless local area network; a broadcasting unit, configured to broadcast the network ID acquisition request in the local area network if no public land mobile network (PLMN) network ID of a local operator has been stored; a second receiving unit, configured to receive the PLMN network ID of the local operator sent from a second mobile communication terminal, the PLMN network ID of the local operator comprising a PLMN network ID of the local operator who has contracted with the home operator of the mobile communication terminal; a first transmitting unit, configured to unicast the PLMN network ID of the local operator to the first mobile communication terminal, or broadcasting the PLMN network ID of the operator within the local area network.

In one implementation, the network server may further include a second transmitting unit, which is configured to unicast the PLMN network ID of the local operator to the first mobile communication terminal if the PLMN network ID of the local operator has been stored.

According to still another implementation of the present disclosure, there is provided a system for accessing a network, which includes the mobile communication terminal and the network server of any of the above-mentioned implementation.

FIG. 1 is a flow diagram illustrating one implementation of a network access method provided in an implementation of the present disclosure, the method illustrated in FIG. 1 can be implemented by a mobile communication terminal. As illustrated in FIG. 1, the method can begin at block 101.

At block 101, a mobile communication terminal accesses a wireless LAN of a place of visit.

In some possible implementations, when the mobile communication terminal arrives at a place of visit from the home thereof, after the first boot or after turning off the flight mode, the mobile communication terminal needs to re-select a network. Before access to a visited PLMN (that is, a VPLMN), the mobile communication terminal cannot connect to the Internet through mobile networks provided by an operator such as General Packet Radio Service (GPRS) network, Enhanced Data Rate for GSM Evolution (EDGE) network, Time Division-Synchronous Code Division Multiple Access (TD-SCDMA) network and the like. However, when the mobile communication terminal is in a wireless network environment, it can first access the wireless network and communicate with other mobile communication terminals or network servers over the wireless network. For example, when a user is just off the plane, just exit, or just disembarked, the airport, gateway, or port may have wireless LAN coverage.

In implementations of the present disclosure, wireless networks can be the wireless LAN or a wireless fidelity (WiFi) wireless network. Currently, the wireless LAN includes the following protocol standards: IEEE802.11 protocol, IEEE802.11a protocol, IEEE802.11g protocol, IEEE802.11E protocol, IEEE802.11i protocol, and Wireless Application Protocol (WAP). WiFi technology is a wireless network communication technology based on the IEEE 802.11 series of standards and can be regarded as a branch of wireless LAN technology. A WiFi wireless network is generated mainly by a router or wireless card, or a wireless AP (Access Point), the speed of transmission thereof is very limited and therefore, the WiFi wireless network is generally adopted by families or small and medium enterprises. Compared with the WiFi wireless network, the wireless LAN has the characteristics of long transmission distance and fast transmission speed. In some possible implementations, airports may prefer wireless LAN.

At block 102, the mobile communication terminal sends a network identity (ID) acquisition request to a network server of the wireless LAN.

Generally, network coverage of the home of the terminal will lost when the user arrives at a place of visit from the home, and the mobile communication terminal needs to access the network of the place of visit to communicate. At this time, the mobile communication terminal can search networks of the place of visit and attempt to conduct network access according to a PLMN list. When the network ID of the place of visit is not contained in the PLMN list of the mobile communication terminal, it is impossible for the mobile communication terminal to conduct network access via the PLMN list; instead, the mobile communication terminal will attempt to conduct network access in other more complex manners.

In an implementation of the present disclosure, in order to be able to quickly access an available mobile network, the mobile communication terminal sends the network ID acquisition request to the network server of the wireless LAN to obtain the PLMN network ID of the place of visit.

At block 103, the mobile communication terminal receives the PLMN network ID of at least one visited operator contracted with a home operator of the mobile communication terminal, and adds the received PLMN network ID to an PLMN list, wherein the PLMN network ID is either unicast or broadcast by the network server in response to the network ID acquisition request.

The PLMN list referred to herein can include at least one of an EHPLMN list and an EHPLMN list, which will be explained respectively.

In one implementation, the mobile communication terminal stores multiple PLMN lists; when comparing the searched VPLMN with the stored PLMN lists, the multiple PLMN lists have different priorities and the EHPLMN has a higher priority. Therefore, in an implementation of the present disclosure, the received PLMN network ID can be added to an EHPLMN list. Based on this, as one example, the mobile communication terminal can add the received PLMN network ID to the EHPLMN list and conduct subsequent processes in accordance with the EHPLMN list; in the following, the implementation will be mainly described based on this scene.

As another example, the mobile communication terminal can add the received network ID to an EPLMN list and when searching networks, the mobile communication terminal can first search the VPLMN and compare each searched VPLMN network ID with network IDs in the EHPLMN list; when the EHPLMN list does not contain a network ID that matches the searched VPLMN network ID, each searched VPLMN network ID will be compared with network IDs in the EPLMN list, and when the EPLMN list contains a network ID that matches the searched VPLMN network ID, it is possible to initiate network registration to a network corresponding to the matched network ID. As an implementation, when there are multiple matched network IDs, it is possible to initiate network registration to a VPLMN network with the strongest signal strength.

In an implementation of the present disclosure, the home operator refers to the home operator of the SIM (Subscriber Identity Module) card or the USIM (Universal Subscriber Identity Module) card in the mobile communication terminal. Specifically, the visited operator contracted with the home operator is an operator, among all visited operators, who has entered a roaming agreement with the home operator. For example, the home operator is "China Mobile"; when the user arrives at Hong Kong from the mainland of China, Hong Kong operators entered a roaming agreement with "China Mobile" will be the visited operator contracted with the home operator, such as "China Mobile Hong Kong".

When searching networks, the mobile communication terminal will compare a searched VPLMN with networks contained in the PLMN list stored at the mobile communication terminal; when there is a matching network, the mobile communication terminal will attempt to access the network. However, not every visited network will allow the mobile communication terminal to access; generally, the PLMN of an operator who has entered a roaming agreement with the home operator of the SIM card or USIM card of the mobile communication terminal is allowed to be accessed.

Optionally, the network server can unicast the PLMN network ID of the place of visit to the mobile communication terminal; alternatively, the network server can broadcast the PLMN network ID in the wireless LAN, such that the PLMN network ID can be received and used by the mobile communication terminal as well as other mobile communication terminals that are in need.

In implementations of the present disclosure, the network ID can include network number segments, for example, the PLMN of China Mobile includes four segments, namely, 46000, 46002, 46007, and 46008; the PLMN of China Unicom includes three segments, namely, 46001, 46006, and 46009.

At block 104, the mobile terminal conducts network access at the place of visit according to the PLMN list.

In some possible implementations, when accessing the wireless local area network (wireless LAN) of the place of visit, the mobile communication terminal can search the PLMN of the place of visit ("VPLMN" for short). After adding the received PLMN network ID to the EHPLMN list, compare the searched VPLMN network ID with network IDs in the EHPLMN list, and when a matched network ID is found, a network corresponding to the matched network ID can be registered directly.

In some possible implementations, in addition to the received PLMN network ID, the EHPLMN list of the mobile communication terminal can still contain other network IDs, and in this case, the mobile terminal can compare the received PLMN network list with the searched VPLMN network list first.

As an implementation, the received PLMN network ID can be added to a preset location of the EHPLMN list; correspondingly, when comparing ID, the mobile communication terminal can compare a network ID located at the preset location of the EHPLMN list with the searched VPLMN network ID.

For example, it can be set in advance that the preset location of the EHPLMN list of the mobile communication terminal is configured to store the PLMN network ID received from a network server of the wireless LAN, for example, it can be specified that line 20-line 30, or line 1-line 15, or line 10-line 15 is configured to be used for storing the PLMN network ID received from the network server of the wireless LAN. In this way, after the VPLMN network ID has been searched, the searched VPLMN network ID can be compared with the network ID at the preset location.

In one implementation, the mobile communication terminal adds the received network ID into the EHPLMN list; when searching networks, the mobile communication terminal can first search the VPLMN, and compares each searched VPLMN network ID with network IDs in the EHPLMN list; when the EHPLMN list contains a network ID that matches the searched VPLMN network ID, then the mobile communication terminal will initiate network registration to a network corresponding to the matched network ID.

In one possible implementation, when the EHPLMN list contains multiple network IDs that match the VPLMN network ID, it is possible to determine the signal strength of VPLMN networks corresponding to each of the multiple network IDs respectively, and initiate network registration to a VPLMN network with the strongest signal strength. It is understandable that, in actual network registration, it is possible to initiate network registration to the network with the strongest signal strength first, when the registration fails, the terminal can continue to initiate network registration to the VPLMN network with the secondary signal strength, until the registration is successful.

In the implementation of the present disclosure, the mobile communication terminal accesses the wireless LAN of the place of visit and sends the network ID acquisition request to the network server of the wireless LAN; the mobile communication terminal receives at least one PLMN network ID unicast or broadcast by the network server and add the same to the EHPLMN list so as to search networks according to the EHPLMN list. Since the EHPLMN list has a higher priority and the EHPLMN list has the PLMN network ID of the place of visit stored therein, when searching networks, the mobile communication terminal can search from the EHPLMN list a network that matches the VPLMN so as to save time that the mobile communication terminal takes to search networks and enhance mobile communication experience of the user.

Figure 2:
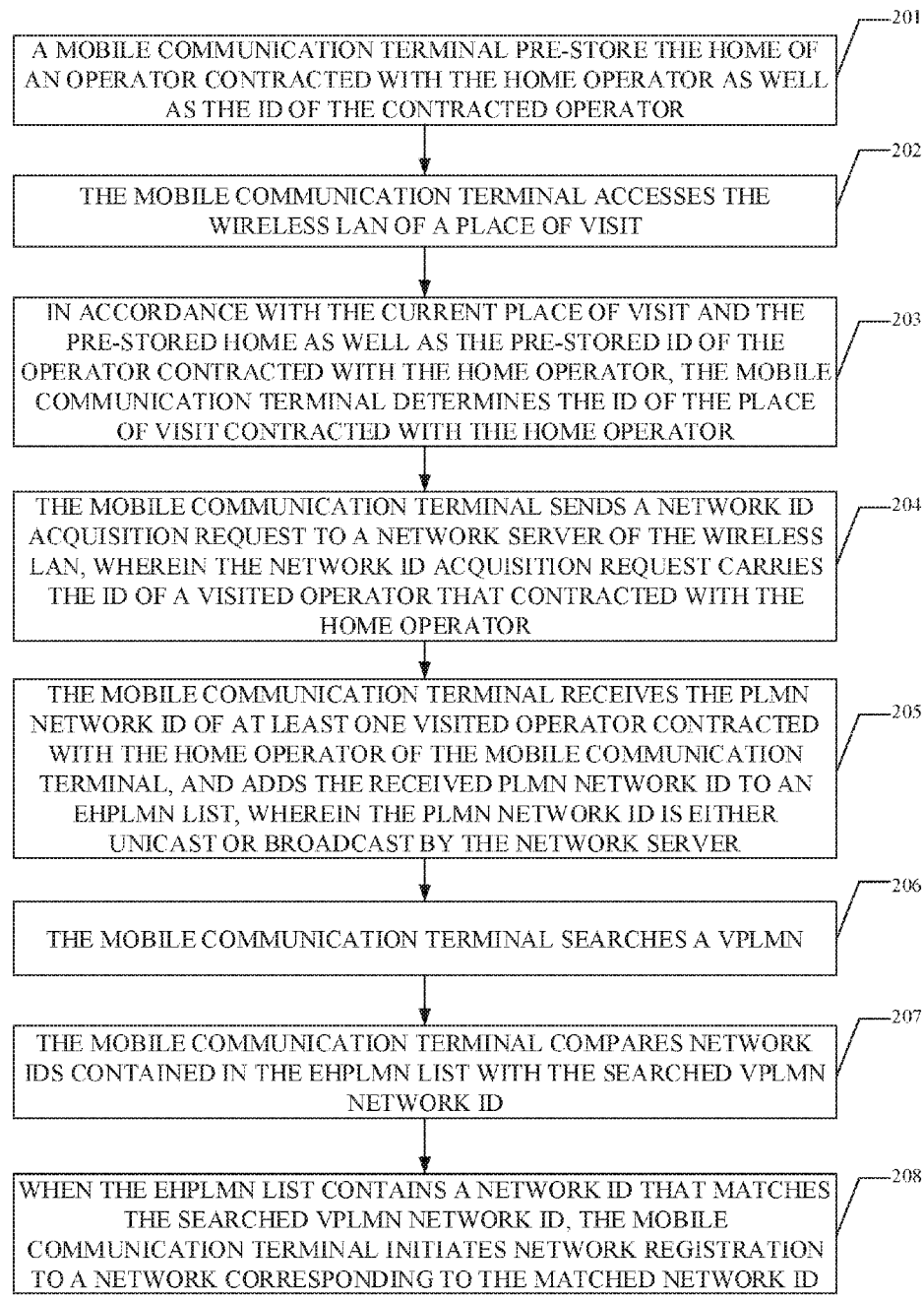
FIG. 2 is a diagram illustrating another implementation of the network access method provided in an implementation of the present disclosure.

FIG. 2 is a flow diagram illustrating a network access method according to another implementation of the present disclosure. The method can be implemented via a mobile communication terminal and as illustrated in FIG. 2, the method can begin at block 201.

At block 201, a mobile communication terminal pre-store the home of an operator contracted with the home operator as well as the ID of the signed operator.

In an implementation of the present disclosure, the home operator refers to the home operator of the SIM (Subscriber Identity Module) card or the USIM (Universal Subscriber Identity Module) card in the mobile communication terminal. Specifically, the visited operator contracted with the home operator is an operator, among all visited operators, who has entered a roaming agreement with the home operator. For example, the home operator is "China Mobile"; when the user arrives at Hong Kong from the mainland of China, Hong Kong operators entered a roaming agreement with "China Mobile" will be the visited operator contracted with the home operator, such as "China Mobile Hong Kong".

In some possible implementations, the home operator, the home of the signed operator, and the ID of the signed operator can be associatively stored in the mobile communication terminal in tabular form. For instance, the home operator of the mobile communication terminal is China Mobile and other operators contracted with China Mobile includes China Mobile Hong Kong; as to China Mobile Hong Kong, the home thereof is Hong Kong and the ID thereof can be "China Mobile Hong Kong", "China Mobile PEOPLES", "China Mobile" or "PEOPLES"; in this case, the mobile communication terminal can associatively store "China Mobile Hong Kong", "China Mobile PEOPLES", "China Mobile" or "PEOPLES" in tabular form.

At block 202, the mobile communication terminal accesses the wireless LAN of a place of visit.

In some possible implementations, when the mobile communication terminal arrives at a place of visit from the home thereof, after the first boot or after turning off of the flight mode, the mobile communication terminal needs to re-select a network. Before access to a visited PLMN (that is, a VPLMN), the mobile communication terminal cannot connect to the Internet through mobile networks provided by an operator such as General Packet Radio Service (GPRS) network, Enhanced Data Rate for GSM Evolution (EDGE) network, Time Division-Synchronous Code Division Multiple Access (TD-SCDMA) network and the like. However, when the mobile communication terminal is in a wireless network environment, it can first access the wireless network and communicate with other mobile communication terminals or network servers over the wireless network. For example, when a user is just off the plane, just exit, or just disembarked, the airport, gateway, or port may have wireless LAN coverage.

In implementations of the present disclosure, wireless networks of an airport can be the wireless LAN or a WiFi wireless network. Currently, the wireless LAN includes the following protocol standards: IEEE802.11 protocol, IEEE802.11a protocol, IEEE802.11g protocol, IEEE802.11E protocol, IEEE802.11i protocol, and Wireless Application Protocol (WAP). WiFi technology is a wireless network communication technology based on the IEEE 802.11 series of standards and can be regarded as a branch of wireless LAN technology. A WiFi wireless network is generated mainly by a router or wireless card, or a wireless AP (Access Point), the speed of transmission thereof is very limited and therefore, the WiFi wireless network is generally adopted by families or small and medium enterprises. Compared with the WiFi wireless network, the wireless LAN has the characteristics of long transmission distance and fast transmission speed. In some possible implementations, airports may prefer wireless LAN.

At block 203, in accordance with the current place of visit and the pre-stored home as well as the pre-stored ID of the operator contracted with the home operator (that is, the signed operator), the mobile communication terminal determines the ID of the place of visit contracted with the home operator.

In some possible implementations, the mobile communication terminal can prompt the user to select or enter the current place of visit. For example, in the case that the mobile communication terminal has not connected to the PLMN and has connected to a wireless LAN, the mobile communication terminal can pop up a prompt box for prompting the user to enter or select the country or region in which he or she is currently located.

After determining the current place of visit of the mobile communication terminal, it is possible to search the signed visited operator according to the pre-stored home of the operator contracted with the home operator, so as to determine the ID of the signed visited operator.

At block 204, the mobile communication terminal sends a network ID acquisition request to a network server of the wireless LAN; the network ID acquisition request carries the ID of a visited operator that contracted with the home operator.

Generally, network coverage of the home of the terminal will lost when the user arrives at a place of visit from the home, and the mobile communication terminal needs to access the network of the place of visit to communicate. At this time, the mobile communication terminal can search networks of the place of visit and attempt to connect one by one. However, not every network of the place of visit can make the mobile communication terminal to access and generally, the network of an operator that has entered a roaming agreement with the home operator of the SIM card or the USIM card of the mobile communication terminal is available for access.

In implementations of the present disclosure, in order to quickly access an available mobile network, the mobile communication terminal sends the network ID acquisition request to the network server of the wireless LAN. The network ID acquisition request carries the ID of the visited operator contracted with the home operator.

At block 205, the mobile communication terminal receives the PLMN network ID of at least one visited operator contracted with the home operator of the mobile communication terminal, and adds the received PLMN network ID to an equivalent home public land mobile network (EHPLMN) list; the PLMN network ID is either unicast or broadcast by the network server.

Optionally, the network server can unicast the PLMN network ID of the place of visit to the mobile communication terminal; alternatively, the network server can broadcast the PLMN network ID in LAN, such that the PLMN network ID can be received and used by the mobile communication terminal as well as other mobile communication terminals that are in need.

In some possible implementations, when the mobile communication terminal searches networks, the EHPLMN list has a higher priority, and after the PLMN network ID unicast or broadcast by the network server has been received, the mobile communication terminal can add the PLMN network ID to the EHPLMN list.

In implementations of the present disclosure, the network ID can include network number segments, for example, the PLMN of China Mobile includes four segments, namely, 46000, 46002, 46007, and 46008; the PLMN of China Unicom includes three segments, namely, 46001, 46006, and 46009.

At block 206, the mobile communication terminal searches a VPLMN.

In the implementation of the present disclosure, "VPLMN" refers to a visited PLMN. When the mobile communication terminal arrives at the place of visit from the home thereof, it will search the VPLMN at the place of visit. Generally, the VPLMN includes multiple mobile networks, some of them are networks of operators contracted with the home operator and are available for access, while some of them are not networks of operators contracted with the home operator and are unavailable for the user to access, or high cost can be resulted after access. For example, when the mobile communication terminal arrives at Hong Kong from the mainland of China, the searched VPLMN can includes "PEOPLES", "CSL", "Orange", "SUNDAY", "HK TELECOM" or networks of other operators.

At block 207, the mobile communication terminal compares network IDs contained in the EHPLMN list with the searched VPLMN network ID.

In the implementation of the present disclosure, the network IDs contained in the EHPLMN list is compared with the searched network ID so as to determine whether the EHPLMN list contains a network ID that matches the searched VPLMN network ID, where "match" refers to the same network operated by the same operator.

At block 208, when the EHPLMN list contains a network ID that matches the searched VPLMN network ID, the mobile communication terminal initiates network registration to a network corresponding to the matched network ID.

In the EHPLMN list, there are IDs of mobile networks operated by the visited operator that contracted with the home operator, where the said IDs are received by the mobile communication terminal. The mobile networks belong to the searched VPLMN and are available for the mobile communication terminal to access; therefore, the mobile communication terminal can initiate network registration to these mobile networks directly.

In an implementation, the mobile communication terminal can access the wireless LAN of the place of visit and sends the network ID acquisition request to the network server of the wireless LAN; the mobile communication terminal receives the PLMN network ID unicast or broadcast by the network server and add the received PLMN network ID to the EHPLMN list and searching networks at the place of visit according to the EHPLMN list. Since the EHPLMN list has a higher priority and the EHPLMN list stores the PLMN network ID of the visited operator, when searching networks, the mobile communication terminal can find directly, in the EHPLMN list, a network that matches the PLMN of the place of visit, so as to save time that the mobile communication terminal takes to search networks and enhance mobile communication experience of the user.

Figure 3:
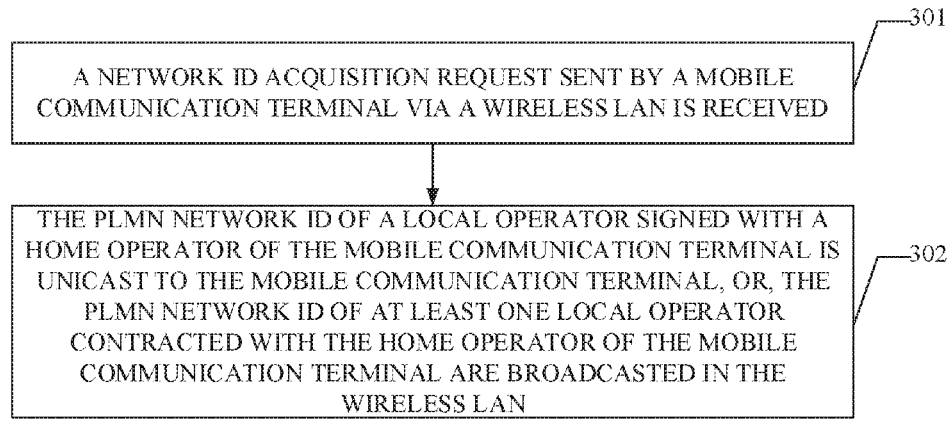
FIG. 3 is a diagram illustrating a further implementation of the network access method provided in an implementation of the present disclosure.

FIG. 3 is a flow diagram illustrating the network access method according to another implementation of the present disclosure. The method can be implemented via a network server. As illustrated in FIG. 3, the method can begin at block 301.

At block 301, a network ID acquisition request sent by a mobile communication terminal via a wireless LAN is received.

The network server of the implementation of the present disclosure is a network server of the wireless LAN of the current place of visit of the mobile communication terminal. Before the network server receives the PLMN network ID request sent by the mobile communication terminal via the wireless LAN, the mobile communication terminal has to access the wireless LAN of the place of visit first.

In some possible implementations, when the mobile communication terminal arrives at a place of visit from the home thereof, after the first boot or after turning off the flight mode, the mobile communication terminal needs to re-select a network. Before access to a PLMN of the place of visit (that is, a VPLMN), the mobile communication terminal cannot connect to the Internet through mobile networks provided by an operator such as GPRS network, EDGE network, TD-SCDMA network and the like. However, when the mobile communication terminal is in a wireless network environment, it can first access the wireless network and communicate with other mobile communication terminals or network servers over the wireless network. For example, when a user is just off the plane, just exit, or just disembarked, the airport, gateway, or port may have wireless LAN coverage, the mobile communication terminal has to access the wireless LAN so as to request to the network server of the wireless LAN.

In implementations of the present disclosure, wireless networks can be the wireless LAN or a WiFi wireless network. Currently, the wireless LAN includes the following protocol standards: IEEE802.11 protocol, IEEE802.11a protocol, IEEE802.11g protocol, IEEE802.11E protocol, IEEE802.11i protocol, and Wireless Application Protocol (WAP). WiFi technology is a wireless network communication technology based on the IEEE 802.11 series of standards and can be regarded as a branch of wireless LAN technology. A WiFi wireless network is generated mainly by a router or wireless card, or a wireless AP (Access Point), the speed of transmission thereof is very limited and therefore, the WiFi wireless network is generally adopted by families or small and medium enterprises. Compared with the WiFi wireless network, the wireless LAN has the characteristics of long transmission distance and fast transmission speed. In some possible implementations, airports may prefer wireless LAN.

At block 302, the PLMN network ID of a local operator contracted with a home operator of the mobile communication terminal is unicast to the mobile communication terminal, or, the PLMN network ID of at least one local operator contracted with the home operator of the mobile communication terminal are broadcast in the wireless LAN.

In the implementation of the present disclosure, "local" refers to the location of the network server.

The network server can pre-store the PLMN network ID of the local operator, and after the network ID acquisition request sent by the mobile communication terminal is received, the network server can send the PLMN network ID of the local operator to the mobile communication terminal that sent the network ID acquisition request, such that the mobile communication terminal can conduct network access according to the PLMN network ID. Alternatively, the network server can broadcast said PLMN network ID of the local operator in the wireless LAN, therefore, in addition to the mobile communication terminal that sent the request, other mobile communication terminals that need said PLMN network ID of the local operator can also obtain the PLMN network ID.

It will be appreciated that, the network server may send PLMN network IDs of multiple local operators stored locally to the mobile communication terminal, alternatively, the network server can send the PLMN network ID of at least one local operator contracted with the home operator of the mobile communication terminal to the mobile communication terminal, so as to reduce the signaling burden on the network and the processing burden of the mobile communication terminal.

In some possible implementations, when storing the PLMN network ID of the local operator, the network server has to store IDs of operators of other regions contracted with the PLMN network ID of the local operator; in this way, after the network ID acquisition request sent by the mobile communication terminal is received, the network server can determine the PLMN network ID of the local operator contracted with the home operator of the mobile communication terminal according to the home operator, and further send the PLMN network ID of at least one local operator to the mobile communication terminal.

In other possible implementations, the network ID acquisition request sent by the mobile communication terminal to the network server carries the ID of an operator. For example, the network ID acquisition request carries the ID of a visited operator contracted with the home operator of the mobile communication terminal. In this way, the network server can unicast the PLMN network ID of the local operator, which matches the ID of the visited operator contracted with the home operator of the mobile communication terminal, to the mobile communication terminal, such that the mobile communication terminal that sends the network ID acquisition request can conduct network access according to the network ID unicast.

In the implementation of the present disclosure, the network server can receive the network ID acquisition request sent by the mobile communication terminal via the wireless LAN, and unicast the PLMN network ID of the local operator to the mobile communication terminal, or broadcast said PLMN network ID in the PLMN such that mobile communication terminals within the wireless LAN can receive the PLMN network ID of the local operator and can quickly find and access the network of the local operator. Therefore, the time that the terminal takes to access a network can be saved, and communication experience of a mobile communication terminal user can be improved.

In a possible implementation, the PLMN network ID of the local operator may not be stored in the network server; this situation will be described in detail with reference to FIG. 4 in the following.

Figure 4:
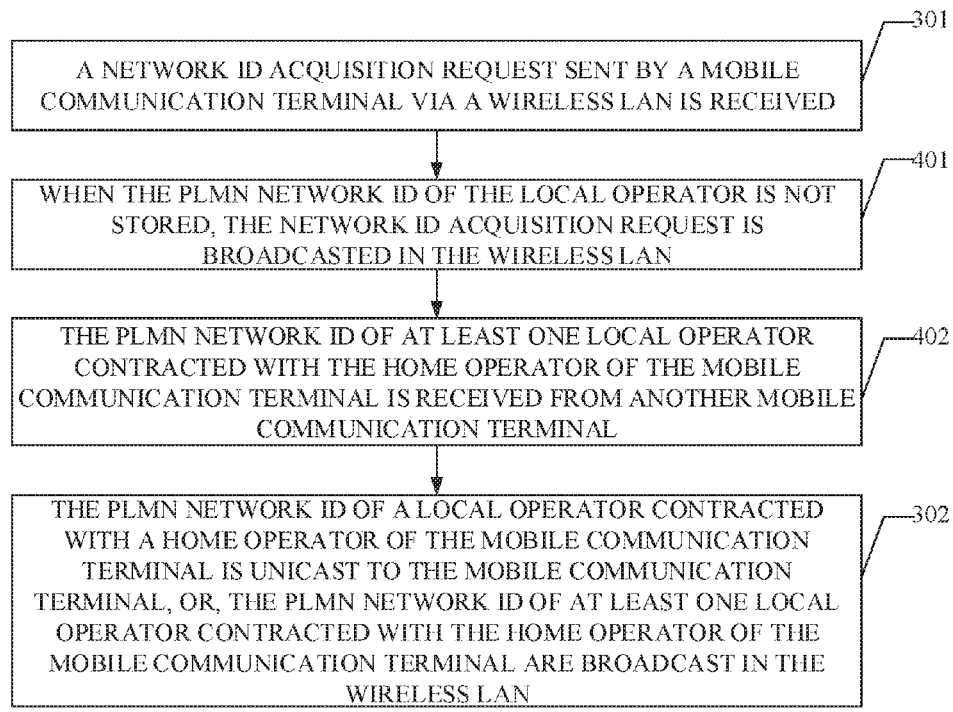
FIG. 4 is structure diagram illustrating an implementation of a mobile communication terminal provided in an implementation of the present disclosure.

FIG. 4 is a flow diagram illustrating the network access method of another implementation of the present disclosure. As illustrated in FIG. 4, on the basis of FIG. 3, the method can further conduct operations at block 401 and block 402 after the operation at block 301 of FIG. 3.

At block 401, when the PLMN network ID of the local operator is not stored, the network ID acquisition request is broadcast in the wireless LAN.

In practice, the network server can broadcast the PLMN network ID request at a certain time interval through timer timing.

At block 402, the PLMN network ID of at least one local operator contracted with the home operator of the mobile communication terminal is received from another mobile communication terminal. Thereafter, the process of FIG. 4 can proceed to S302 for the network server to unicast or broadcast the PLMN network ID of the local operator contracted with the home operator of the mobile communication terminal.

For a mobile communication terminal with the wireless LAN, it can choose to receive or not receive a message broadcast in the wireless LAN.

In some possible implementations, another mobile communication terminal within said wireless LAN receives the PLMN network ID acquisition request broadcast by the network server; in response to the PLMN network ID acquisition request, said another mobile communication terminal sends the PLMN network ID of the local operator stored locally to the network server, then the network server can receive and save the PLMN network ID of the local operator sent by said another mobile communication terminal.

In the implementation of the present disclosure, after the network ID acquisition request sent by the mobile communication terminal via the wireless LAN is received by the network server. When the PLMN network ID of the local operator is not stored, the network server can broadcast the network ID acquisition request in the wireless LAN and receive the PLMN network ID of the local operator sent by another mobile communication terminal in response to the request, and then unicast the PLMN network ID of the local operator to the mobile communication terminal that sends the request, or broadcast the PLMN network ID in the wireless LAN. Mobile communication terminals within the wireless LAN can receive the PLMN network ID of the local operator, and in this way, it can quickly find and access a network of the local operator, such that the time consumed for network access can be saved and communication experience of a mobile communication terminal user can be enhanced.

Figure 5:
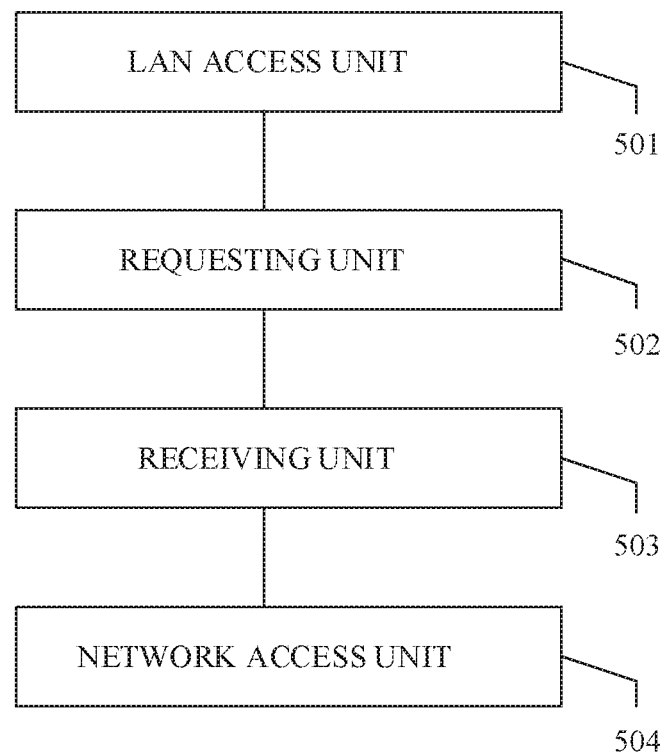
FIG. 5 is structure diagram illustrating another implementation of the mobile communication terminal provided in an implementation of the present disclosure.

FIG. 5 is a structure diagram illustrating a mobile communication terminal according to one implementation. As illustrated in FIG. 5, the mobile communication terminal can include a LAN access unit 501, a requesting unit 502 (such as a transmitter), a receiving unit 503 (such as a receiver), and a network access unit 504. The requesting unit 502 and the receiving unit 503 can be integrated into one transmitter as needed. The LAN access unit 501 and the network access unit 504 can be integrated into one access controller or can be configured to be independent access controllers separately; the present disclosure is not limited thereto.

The LAN access unit 501 is configured to access the wireless LAN of a place of visit.

In some possible implementations, when the mobile communication terminal arrives at a place of visit from the home thereof, after the first boot or after turning off of the flight mode, the mobile communication terminal needs to re-select a network. Before access to a visited PLMN (that is, a VPLMN), the mobile communication terminal cannot connect to the Internet through mobile networks provided by an operator such as General Packet Radio Service (GPRS) network, Enhanced Data Rate for GSM Evolution (EDGE) network, Time Division-Synchronous Code Division Multiple Access (TD-SCDMA) network and the like. However, when the mobile communication terminal is in a wireless network environment, it can first access the wireless network and communicate with other mobile communication terminals or network servers over the wireless network. For example, when a user is just off the plane, just exit, or just disembarked, the airport, gateway, or port may have wireless local area network (wireless LAN) coverage.

In implementations of the present disclosure, wireless networks can be the wireless LAN or a wireless fidelity (WiFi) wireless network. Currently, the wireless LAN includes the following protocol standards: IEEE802.11 protocol, IEEE802.11a protocol, IEEE802.11g protocol, IEEE802.11E protocol, IEEE802.11i protocol, and Wireless Application Protocol (WAP). WiFi technology is a wireless network communication technology based on the IEEE 802.11 series of standards and can be regarded as a branch of wireless LAN technology. A WiFi wireless network is generated mainly by a router or wireless card, or a wireless AP (Access Point), the speed of transmission thereof is very limited and therefore, the WiFi wireless network is generally adopted by families or small and medium enterprises. Compared with the WiFi wireless network, the wireless LAN has the characteristics of long transmission distance and fast transmission speed. In some possible implementations, airports may prefer wireless LAN.

The requesting unit 502 is configured to send a network ID acquisition request to a network server of the wireless LAN.

Generally, network coverage of the home of the terminal will lost when the user arrives at a place of visit from the home, and the mobile communication terminal needs to access the network of the place of visit to communicate. At this time, the mobile communication terminal can search networks of the place of visit and attempt to conduct network access according to a PLMN list. When the network ID of the place of visit is not contained in the PLMN list of the mobile communication terminal, it is impossible for the mobile communication terminal to conduct network access via the PLMN list; instead, the mobile communication terminal will attempt to conduct network access in other more complex manners.

In an implementation of the present disclosure, in order to be able to quickly access an available mobile network, the mobile communication terminal sends the network ID acquisition request to the network server of the wireless LAN to obtain the PLMN network ID of the place of visit.

The receiving unit 503 is configured to receive the PLMN network ID of at least one visited operator contracted with a home operator of the mobile communication terminal, and adds the received PLMN network ID to a PLMN list; the PLMN network ID is either unicast or broadcast by the network server in response to the network ID acquisition request.

The PLMN list referred to herein can include at least one of an EHPLMN list and an EHPLMN list, which will be explained respectively.

In one implementation, the mobile communication terminal stores multiple PLMN lists; when comparing the searched VPLMN with the stored PLMN lists, the multiple PLMN lists have different priorities and the EHPLMN has a higher priority. Therefore, in an implementation of the present disclosure, the received PLMN network ID can be added to an EHPLMN list. Based on this, as one example, the receiving unit 503 can add the received PLMN network ID to the EHPLMN list and the mobile communication terminal can conduct subsequent processes in accordance with the EHPLMN list; in the following, the implementation will be mainly described based on this scene.

As another example, the receiving unit 503 can add the received network ID to an EPLMN list and when searching networks and subsequently, the mobile communication terminal can first search the VPLMN and compare each searched VPLMN network ID with network IDs in the EHPLMN list; when the EHPLMN list does not contain a network ID that matches the searched VPLMN network ID, each searched VPLMN network ID will be compared with network IDs in the EPLMN list, and when the EPLMN list contains a network ID that matches the searched VPLMN network ID, it is possible to initiate network registration to a network corresponding to the matched network ID. As an implementation, when there are multiple matched network IDs, it is possible to initiate network registration to a VPLMN network with the strongest signal strength.

In an implementation of the present disclosure, the home operator refers to the home operator of the SIM card or the USIM card in the mobile communication terminal. Specifically, the visited operator contracted with the home operator is an operator, among all visited operators, who has entered a roaming agreement with the home operator. For example, the home operator is "China Mobile"; when the user arrives at Hong Kong from the mainland of China, Hong Kong operators entered a roaming agreement with "China Mobile" will be the visited operator contracted with the home operator, such as "China Mobile Hong Kong".

When searching networks, the mobile communication terminal will compare a searched VPLMN with networks contained in the PLMN list stored at the mobile communication terminal; when there is a matching network, the mobile communication terminal will attempt to access the network. However, not every visited network will allow the mobile communication terminal to access; generally, the PLMN of an operator who has entered a roaming agreement with the home operator of the SIM card or USIM card of the mobile communication terminal is allowed to be accessed.

Optionally, the network server can unicast the PLMN network ID of the place of visit to the mobile communication terminal; alternatively, the network server can broadcast the PLMN network ID in the wireless LAN, such that the PLMN network ID can be received and used by the mobile communication terminal as well as other mobile communication terminals that are in need.

After the PLMN network ID unicast or broadcast by the network server is received, the mobile communication terminal can add the PLMN network ID to the PLMN list for use in subsequent network search. Alternatively, the mobile communication terminal can add the PLMN network ID to the EHPLMN list or the EPLMN list.

In implementations of the present disclosure, the network ID can include network number segments, for example, the PLMN of China Mobile includes four segments, namely, 46000, 46002, 46007, and 46008; the PLMN of China Unicom includes three segments, namely, 46001, 46006, and 46009.

The network access unit 504 is configured to conduct network access at the place of visit according to the EHPLMN list.

Specifically, when the mobile communication terminal access a network of the place of visit according to the EHPLMN list, since the EHPLMN list has stored the PLMN network ID of the local operator that sends by the server of the place of visit, the time consumed by the mobile communication terminal to search networks can be saved.

In the implementation of the present disclosure, the mobile communication network can access the wireless LAN of the place of visit via the LAN access unit 501 and send the network ID acquisition request to the network server of the wireless LAN via the requesting unit 502. Thereafter, the mobile communication terminal can receive via the receiving unit 503 the PLMN network ID unicast or broadcast by the network server and add via the receiving unit 503 the received PLMN network ID to the EHPLMN list, so as to search networks at the place of visit according to the EHPLMN list. Since the EHPLMN list has a higher priority and the EPHLMN list has the PLMN network ID of the place of visit stored therein, when searching networks, the mobile communication terminal can find from the EHPLMN list a network that matches the PLMN of the place of visit. In this way, the time consumed by the mobile communication terminal to search networks can be saved and mobile communication experience of the user can be improved.

Figure 6:
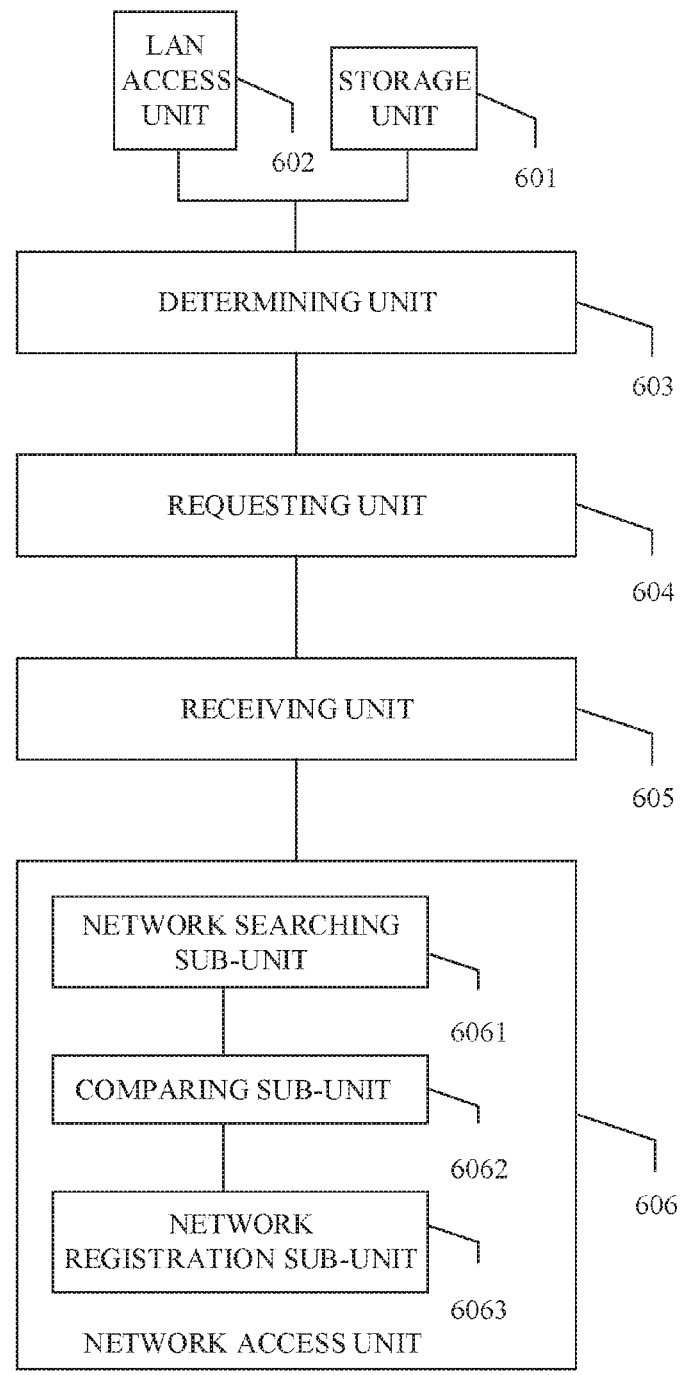
FIG. 6 is structure diagram illustrating an implementation of a network access unit in the mobile communication terminal provided in an implementation of the present disclosure.

FIG. 6 is a structure diagram illustrating a mobile communication terminal of another implementation of the present disclosure. As illustrated in FIG. 6, the mobile communication terminal can include a storage unit 601 (such as storage, RAM, ROM, and the like), a LAN access unit 602, a determining unit 603, a requesting unit 604, a receiving unit 605, and a network access unit 606.

The storage unit 601 is configured to pre-store the home of an operator contracted with the home operator as well as the ID of the signed operator.

In an implementation of the present disclosure, the home operator refers to the home operator of the SIM card or the USIM card in the mobile communication terminal. Specifically, the visited operator contracted with the home operator is an operator, among all visited operators, who has entered a roaming agreement with the home operator. For example, the home operator is "China Mobile"; when the user arrives at Hong Kong from the mainland of China, Hong Kong operators entered a roaming agreement with "China Mobile" will be the visited operator contracted with the home operator, such as "China Mobile Hong Kong".

In some possible implementations, the home operator, the home of the signed operator, and the ID of the signed operator can be associatively stored in the mobile communication terminal in tabular form. For instance, the home operator of the mobile communication terminal is China Mobile and other operators contracted with China Mobile includes China Mobile Hong Kong; as to China Mobile Hong Kong, the home thereof is Hong Kong and the ID thereof can be "China Mobile Hong Kong", "China Mobile PEOPLES", "China Mobile" or "PEOPLES"; in this case, the mobile communication terminal can associatively store "China Mobile Hong Kong", "China Mobile PEOPLES", "China Mobile" or "PEOPLES" in tabular form.

The LAN access unit 602 is configured to access the wireless LAN of the place of visit.

In some possible implementations, when the mobile communication terminal arrives at a place of visit from the home thereof, after the first boot or after turning off the flight mode, the mobile communication terminal needs to re-select a network. Before access to a PLMN of the place of visit (that is, a VPLMN), the mobile communication terminal cannot connect to the Internet through mobile networks provided by an operator such as GPRS network, Enhanced Data Rate for EDGE network, TD-SCDMA network and the like. However, when the mobile communication terminal is in a wireless network environment, it can first access the wireless network and communicate with other mobile communication terminals or network servers over the wireless network. For example, when a user is just off the plane, just exit, or just disembarked, the airport, gateway, or port may have wireless LAN coverage.

In implementations of the present disclosure, wireless networks of an airport can be the wireless LAN or a WiFi wireless network. Currently, the wireless LAN includes the following protocol standards: IEEE802.11 protocol, IEEE802.11a protocol, IEEE802.11g protocol, IEEE802.11E protocol, IEEE802.11i protocol, and Wireless Application Protocol (WAP). WiFi technology is a wireless network communication technology based on the IEEE 802.11 series of standards and can be regarded as a branch of wireless LAN technology. A WiFi wireless network is generated mainly by a router or wireless card, or a wireless AP, the speed of transmission thereof is very limited and therefore, the WiFi wireless network is generally adopted by families or small and medium enterprises. Compared with the WiFi wireless network, the wireless LAN has the characteristics of long transmission distance and fast transmission speed. In some possible implementations, airports may prefer wireless LAN.

The determining unit 603 is configured to determine, on the basis of the current place of visit and the pre-stored home of the operator contracted with the home operator as well as the ID of the signed operator, the ID of a visited operator that signs with the home operator.

In some possible implementations, the mobile communication terminal can prompt the user to select or enter the current place of visit. For example, in the case that the mobile communication terminal has not connected to the PLMN and has connected to a wireless LAN, the mobile communication terminal can pop up a prompt box for prompting the user to enter or select the country or region in which he or she is currently located.

After determining the current place of visit of the mobile communication terminal, it is possible to search the signed visited operator according to the pre-stored home of the operator contracted with the home operator, so as to determine the ID of the signed visited operator.

The requesting unit 604 is configured to send a network ID acquisition request to a network server of the wireless LAN; the network ID acquisition request carries the ID of a visited operator that contracted with the home operator.

Generally, network coverage of the home of the terminal will lost when the user arrives at a place of visit from the home, and the mobile communication terminal needs to access the network of the place of visit to communicate. At this time, the mobile communication terminal can search networks of the place of visit and attempt to connect one by one. However, not every network of the place of visit can make the mobile communication terminal to access and generally, the network of an operator that has entered a roaming agreement with the home operator of the SIM card or the USIM card of the mobile communication terminal is available for access.

In implementations of the present disclosure, in order to quickly access an available mobile network, the mobile communication terminal sends the network ID acquisition request to the network server of the wireless LAN via the requesting unit 604 for example. The network ID acquisition request carries the ID of the visited operator contracted with the home operator.

The receiving unit 605 is configured to receive the PLMN network ID of at least one visited operator contracted with the home operator of the mobile communication terminal, and add the received PLMN network ID to an EHPLMN list; the PLMN network ID is either unicast or broadcast by the network server.

Optionally, the network server can unicast the PLMN network ID of the place of visit to the mobile communication terminal; alternatively, the network server can broadcast the PLMN network ID in LAN, such that the PLMN network ID can be received and used by the mobile communication terminal as well as other mobile communication terminals that are in need.

In some possible implementations, when the mobile communication terminal searches networks, the EHPLMN list has a higher priority, and after the PLMN network ID unicast or broadcast by the network server has been received by the receiving unit 605, the mobile communication terminal can add the PLMN network ID to the EHPLMN list via the receiving unit 605.

In the implementation of the present disclosure, the network ID can include network number segments, for example, the PLMN of China Mobile includes four segments, namely, 46000, 46002, 46007, and 46008; the PLMN of China Unicorn includes three segments, namely, 46001, 46006, and 46009.

The network access unit 606 is configured to search networks at the place of visit according to the PLMN list.

In some possible implementations, as illustrated in FIG. 6, the network access unit 606 can include a network searching sub-unit 6061, a comparing sub-unit 6062, and a network registration sub-unit 6063.

The network searching unit 5061 is configured to search a VPLMN.

In the implementation of the present disclosure, "VPLMN" refers to the PLMN of the place of visit. When the mobile communication terminal arrives at the place of visit from the home thereof, it will search the VPLMN at the place of visit via the network searching sub-unit 6061. Generally, the VPLMN includes multiple mobile networks, some of them are networks of operators contracted with the home operator and are available for access, while some of them are not networks of operators contracted with the home operator and are unavailable for the user to access, or high cost can be resulted after access. For example, when the mobile communication terminal arrives at Hong Kong from the mainland of China, the searched VPLMN can include "PEOPLES", "CSL", "Orange", "SUNDAY", "HK TELECOM" or networks of other operators.

The comparing sub-unit 6062 is configured to compare network IDs contained in the EHPLMN list with the VPLMN network ID. As an implementation, when the receiving unit 605 adds the received PLMN network ID to the EPLMN list, the comparing sub-unit 6062 can be further configured to compare network IDs contained in the EHPLMN list with the network ID of a searched VPLMN, and compare network IDs contained in the EPLMN list with the network ID of the searched VPLMN when the EHPLMN list does not contain a network ID that matches the network ID of the searched VPLMN; correspondingly, the network registration sub-unit 6063 is configured to initiate network registration to a network corresponding to a network ID that matches the network ID of the searched VPLMN when the EHPLMN list contains the network ID that matches the network ID of the searched VPLMN.

In some possible implementations, when accessing the wireless LAN of the place of visit, the mobile communication terminal can search the VPLMN via the network searching sub-unit 6061. After adding the received PLMN network ID to the EHPLMN list via the receiving unit 605, compare the searched VPLMN network ID with network IDs in the EHPLMN list via the comparing sub-unit 6062, and when a matched network ID is found, a network corresponding to the matched network ID can be registered directly via the network registration sub-unit 6063.

In some possible implementations, in addition to the received PLMN network ID, the EHPLMN list of the mobile communication terminal can still contain other network IDs, and in this case, the mobile communication terminal can first compare the received PLMN network ID in the EHPLMN list with the searched VPLMN network ID via the comparing sub-unit 6062.

Correspondingly, the receiving unit 605 is configured to add the received PLMN network ID to a preset location of the EHPLMN list. The comparing sub-unit 6062 is configured to compare a network ID located at the preset location of the EHPLMN list with the searched VPLMN network ID.

For example, it can be set in advance that the preset location of the EHPLMN list of the mobile communication terminal is configured to store the PLMN network ID received from a network server of the wireless LAN, for example, it can be specified that line 20-line 30, or line 1-line 15, or line 10-line 15 is configured to be used for storing the PLMN network ID received from the network server of the wireless LAN. In this way, after the VPLMN network ID has been searched, the searched VPLMN network ID can be compared with the network ID at the preset location.

In one implementation, the mobile communication terminal adds the received network ID into the EHPLMN list; when searching networks, the mobile communication terminal can first search the VPLMN via the network searching sub-unit 6061, and compares each searched VPLMN network ID with network IDs in the EHPLMN list via the comparing sub-unit 6062; when the EHPLMN list contains a network ID that matches the searched VPLMN network ID, the mobile communication terminal will initiates network registration to a network corresponding to the matched network ID via the network registration sub-unit 6063.

In the implementation of the present disclosure, network IDs contained in the EHPLMN list are compared with the searched VPLMN network ID so as to determine whether the EHPLMN list has any network ID that matches the searched VPLMN network ID via the comparing sub-unit 6062 for example, where "match" refers to the same network operated by the same operator.

The network registration sub-unit 6063 is configured to initiate network registration to a network corresponding to the matched network ID when said matched network ID of the VPLMN network ID is exist in the EHPLMN list.

In one possible implementation, when in the EHPLMN list there are multiple network IDs that matches the VPLMN network ID, the network registration sub-unit 6063 is further configured to: determine the signal strength of VPLMN networks corresponding to each of the multiple network IDs respectively, and initiate network registration to a VPLMN network with the strongest signal strength.

It is understandable that, in actual network registration, it is possible to initiate network registration to the network with the strongest signal strength first, when the registration fails, the terminal can continue to initiate network registration to the VPLMN network with the secondary signal strength, until the registration is successful.

It should be noted that the above description and the advantageous effects of the network access method described in FIG. 1 are also applicable to the mobile communication terminal of the present implementation, and will not be described again.

In an implementation of the present disclosure, the mobile communication terminal accesses the wireless LAN of the place of visit and sends the network ID acquisition request to the network server of the wireless LAN; the mobile communication terminal receives the PLMN network ID unicast or broadcast by the network server and add the received PLMN network ID to the EHPLMN list so as to search networks at the place of visit according to the EHPLMN list. Since the EHPLMN list has a higher priority and it has the PLMN network ID of the visited operator stored therein, when searching networks, the mobile communication terminal can find a network that matches the PLMN of the place of visit from the EHPLMN list. The time that the mobile communication terminal consumed to search networks can be saved, and the mobile communication experience of the user can be improved.

Figure 7:
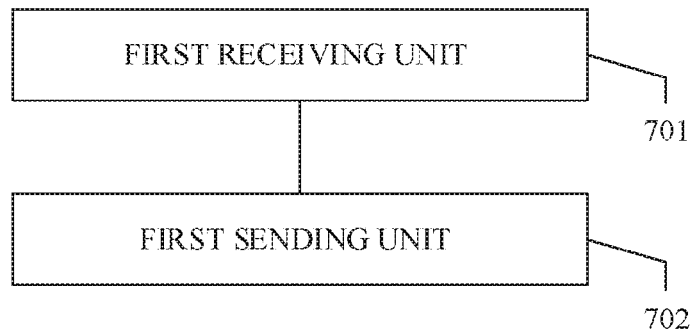
FIG. 7 is structure diagram illustrating an implementation of a network server provided in an implementation of the present disclosure.

FIG. 7 is a structure diagram illustrating a network server according to an implementation of the present disclosure. As illustrated in FIG. 7, the network server can include a first receiving unit 701 (such as a receiver) and a first sending unit 702 (such as a transmitter). The first receiving unit 701 and the first sending unit 702 can be integrated into one transmitter as needed.

The first receiving unit 701 is configured to receive a network ID acquisition request sent by a mobile communication terminal via a wireless LAN. The first sending unit 702 is configured to unicast, to the mobile communication terminal, the PLMN network ID of a local operator contracted with a home operator of the mobile communication terminal, or broadcast in the wireless LAN, to the mobile communication terminal, the PLMN network ID of at least one local operator contracted with a home operator of the mobile communication terminal.

In this implementation of the present disclosure, "local" refers to the location of the network server.

The network server of the implementation of the present disclosure is a network server of the wireless LAN of the current place of visit of the mobile communication terminal. Before the network server receives the PLMN network ID request sent by the mobile communication terminal via the wireless LAN, the mobile communication terminal has to access the wireless LAN of the place of visit first.

In some possible implementations, when the mobile communication terminal arrives at a place of visit from the home thereof, after the first boot or after turning off the flight mode, the mobile communication terminal needs to re-select a network. Before access to a PLMN of the place of visit (that is, a VPLMN), the mobile communication terminal cannot connect to the Internet through mobile networks provided by an operator such as GPRS network, EDGE network, TD-SCDMA network and the like. However, when the mobile communication terminal is in a wireless network environment, it can first access the wireless network and communicate with other mobile communication terminals or network servers over the wireless network. For example, when a user is just off the plane, just exit, or just disembarked, the airport, gateway, or port may have wireless LAN coverage, the mobile communication terminal has to access the wireless LAN so as to request to the network server of the wireless LAN.

In implementations of the present disclosure, wireless networks can be the wireless LAN or a WiFi wireless network. Currently, the wireless LAN includes the following protocol standards: IEEE802.11 protocol, IEEE802.11a protocol, IEEE802.11g protocol, IEEE802.11E protocol, IEEE802.11i protocol, and Wireless Application Protocol (WAP). WiFi technology is a wireless network communication technology based on the IEEE 802.11 series of standards and can be regarded as a branch of wireless LAN technology. A WiFi wireless network is generated mainly by a router or wireless card, or a wireless AP (Access Point), the speed of transmission thereof is very limited and therefore, the WiFi wireless network is generally adopted by families or small and medium enterprises. Compared with the WiFi wireless network, the wireless LAN has the characteristics of long transmission distance and fast transmission speed. In some possible implementations, airports may prefer wireless LAN.

The network server can pre-store the PLMN network ID of the local operator, and after the network ID acquisition request sent by the mobile communication terminal is received, the network server can send the PLMN network ID of the local operator to the mobile communication terminal that sent the network ID acquisition request, such that the mobile communication terminal can conduct network access according to the PLMN network ID. Alternatively, the network server can broadcast said PLMN network ID of the local operator in the wireless LAN, therefore, in addition to the mobile communication terminal that sent the request, other mobile communication terminals that need said PLMN network ID of the local operator can also obtain the PLMN network ID.

It will be appreciated that, the network server may send PLMN network IDs of multiple local operators stored locally to the mobile communication terminal, alternatively, the network server can send the PLMN network ID of at least one local operator contracted with the home operator of the mobile communication terminal to the mobile communication terminal, so as to reduce the signaling burden on the network and the processing burden of the mobile communication terminal.

In some possible implementations, when storing the PLMN network ID of the local operator, the network server has to store IDs of operators of other regions contracted with the PLMN network ID of the local operator; in this way, after the network ID acquisition request sent by the mobile communication terminal is received, the network server can determine the PLMN network ID of the local operator contracted with the home operator of the mobile communication terminal according to the home operator, and further send the PLMN network ID of at least one local operator to the mobile communication terminal.

In other possible implementations, the network ID acquisition request sent by the mobile communication terminal to the network server carries the ID of an operator. For example, the network ID acquisition request carries the ID of a visited operator contracted with the home operator of the mobile communication terminal. In this way, the network server can unicast the PLMN network ID of the local operator, which matches the ID of the visited operator contracted with the home operator of the mobile communication terminal, to the mobile communication terminal, such that the mobile communication terminal that sends the network ID acquisition request can conduct network access according to the network ID unicast.

In the implementation of the present disclosure, the network server can receive the network ID acquisition request sent by the mobile communication terminal via the wireless LAN and unicast the PLMN network ID of the local operator to the mobile communication terminal that sent the request, or the network server can broadcast the PLMN network ID in the wireless LAN, such that the mobile communication terminal within the wireless LAN can receive the PLMN network ID of the local operator and can quickly fine and access the network of the local operator. The time consumed to access a network can be saved and communication experience of the mobile communication terminal user can be improved.

In one possible implementation, the network server may not have the PLMN network ID of the local operator stored therein. This situation will be described in detail with reference to FIG. 8.

Figure 8:
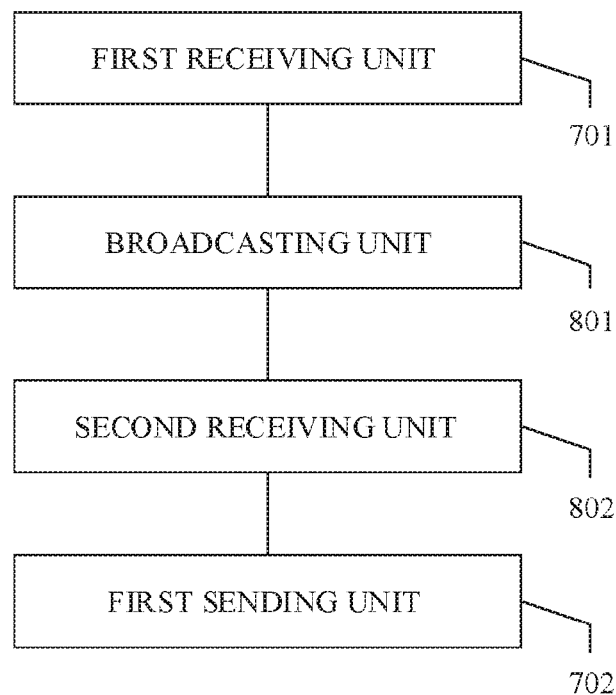
FIG. 8 is structure diagram illustrating another implementation of the network server provided in an implementation of the present disclosure.

FIG. 8 is a structure diagram illustrating a server according to an implementation of the present disclosure. As illustrated in FIG. 8, on the basis of FIG. 7, the server can further include the follows.

A first broadcast unit 801, configured to broadcast the network ID acquisition request in the wireless LAN when the PLMN network ID of the local operator is not stored.

In some possible implementations, the network server does not have the PLMN network ID stored thereon, and the network server can broadcast the received PLMN network ID request in the wireless LAN.

In practice, the network server can broadcast the PLMN network ID request at a certain time interval through timer timing.

In the implementation of the present disclosure, "local" refers to the location of the network server.

The second receiving unit 802 is configured to receive, from another mobile communication terminal, the PLMN network ID of at least one local operator contracted with the home operator of the mobile communication terminal.

For a mobile communication terminal with the wireless LAN, it can choose to receive or not receive a message broadcast in the wireless LAN.

In some possible implementations, another mobile communication terminal within said wireless LAN receives the PLMN network ID acquisition request broadcast by the network server; in response to the PLMN network ID acquisition request, said another mobile communication terminal sends the PLMN network ID of the local operator stored locally to the network server, then the network server can receive and save the PLMN network ID of the local operator sent by said another mobile communication terminal.

Alternatively, when the network server receives the PLMN network ID of the operator sent from said another mobile communication terminal, it can send the PLMN network ID of the operator to the mobile communication terminal that sent the request, such that the mobile communication terminal can conduct network access according to the PLMN network ID. Or, the network server can broadcast the received PLMN network ID of the operator in the wireless LAN, in this way, in addition to the mobile communication terminal that sent the request, other mobile communication terminals requiring the PLMN network ID of the operator can obtain the PLMN network ID either.

In other possible implementations, the network ID acquisition request sent by the mobile communication terminal to the network server carries the ID of an operator, and the network server can unicast the PLMN network ID of said operator to the mobile communication terminal.

In the implementation of the present disclosure, the network server can receive the network ID acquisition request sent by the mobile communication terminal via the wireless LAN. When the PLMN network ID of the local operator is not stored, the network server can broadcast the network ID acquisition request in the wireless LAN and receive the PLMN network ID of the local operator sent by another mobile communication terminal in response to the request, and then unicast the PLMN network ID of the local operator to the mobile communication terminal that sends the request, or broadcast the PLMN network ID in the wireless LAN. When the PLMN network ID of said operator is stored, the network server can unicast the PLMN network ID to the mobile communication terminal that sent the request directly. Mobile communication terminals within the wireless LAN can receive the PLMN network ID of the local operator, and in this way, it can quickly find and access a network of the local operator, such that the time consumed for network access can be saved and communication experience of a mobile communication terminal user can be enhanced.

Figure 9:
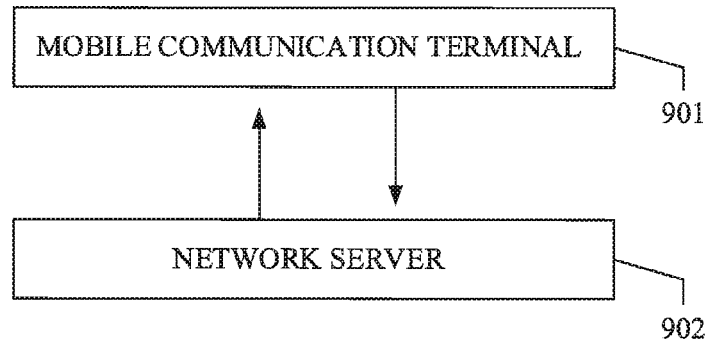
FIG. 9 is structure diagram illustrating an implementation of a network access system provided in an implementation of the present disclosure.

FIG. 9 is a structure diagram illustrating a network access system according to an implementation of the present disclosure. As illustrated in FIG. 9, the network access system includes a mobile communication terminal 901 and a network server 902, among them, the mobile communication terminal 901 can be the mobile communication terminal illustrated in FIG. 5 or FIG. 6 and the network server can be the network server illustrated in FIG. 7 or FIG. 8.

According to the description of the mobile communication terminal in accordance with FIG. 5-FIG. 6 and the description of the network server in FIG. 7-FIG. 8, with aid of the implementations of the present disclosure, the time consumed by the mobile communication terminal to access a network can be saved, and the communication experience of the mobile communication user can be improved.

Figure 10:
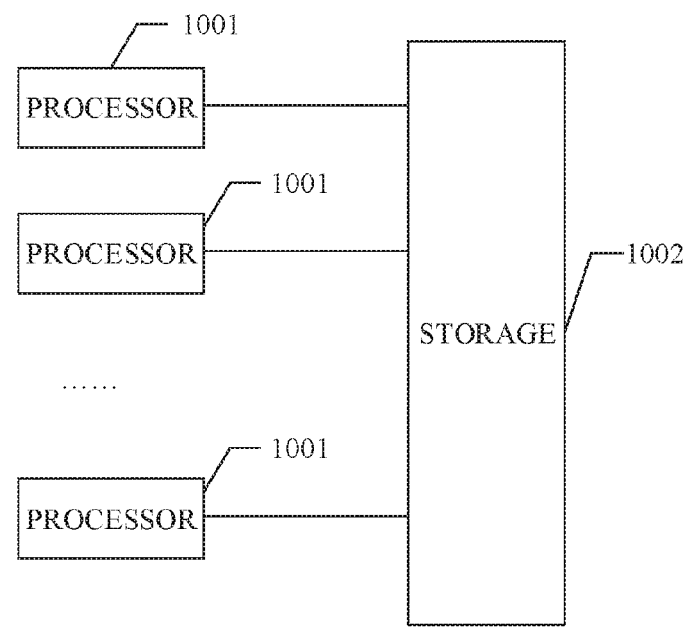
FIG. 10 is a structure diagram illustrating a mobile communication terminal according to an implementation of the present disclosure.

FIG. 10 is a structure diagram illustrating a mobile communication terminal according to an implementation of the present disclosure.

As illustrated in FIG. 10, the mobile communication terminal includes one or more processors 1001 and a memory 1002.

The memory 1002 is configured to store one or more programs, and when executed by the one or more processors 1001, the programs are adapted to perform the network access method of FIG. 1 or FIG. 2 as well as perform the units or elements of the mobile communication terminal as illustrated in at least one of FIG. 5 and FIG. 6.

Figure 11:
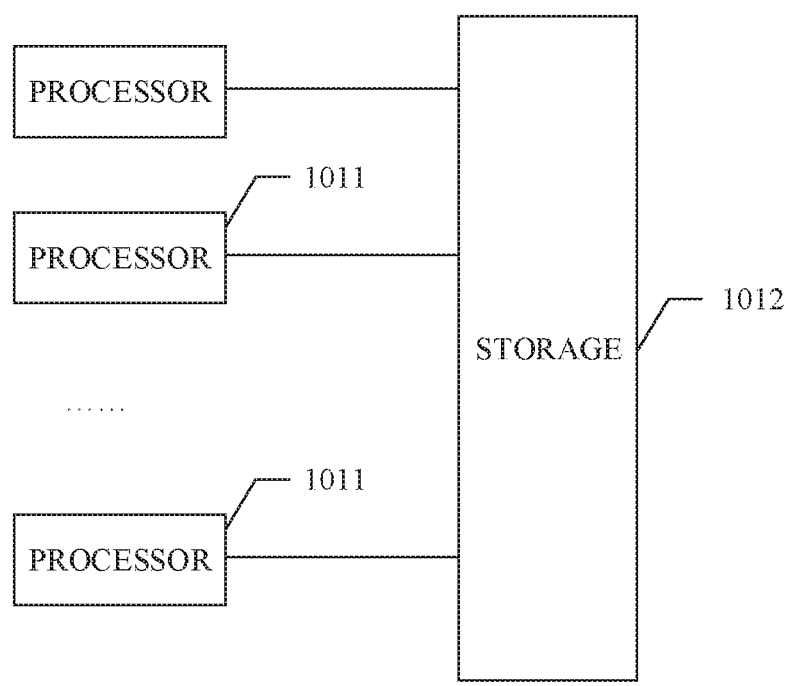
FIG. 11 is a structure diagram illustrating a network server according to an implementation of the present disclosure.

FIG. 11 is a structure diagram illustrating a network server according to an implementation of the present disclosure.

As illustrated in FIG. 11, the network server can include one or more processors 1011 and a memory 1012.

The memory 1012 is configured to store one or more programs, and when executed by the one or more processors 1011, the programs are adapted to perform the network access method of FIG. 3 or FIG. 4 as well as perform the units or elements of the mobile communication terminal as illustrated in at least one of FIG. 7 and FIG. 8.

Based on the network access method of the implementation of FIG. 1 or FIG. 2, the present disclosure further provides a nonvolatile computer storage medium configured to store one or more programs, when executed by an apparatus such as a mobile communication terminal, the programs are adapted make the mobile communication terminal to perform the network access method of FIG. 1 or FIG. 2.

Based on the network access method of the implementation of FIG. 3 or FIG. 4, the present disclosure further provides a nonvolatile computer storage medium configured to store one or more programs, when executed by an apparatus such as a mobile communication terminal, the programs are adapted make the mobile communication terminal to perform the network access method of FIG. 3 or FIG. 4.

The modules or sub-modules in all implementations of the present disclosure may be implemented by a general purpose integrated circuit, such as a CPU (Central Processing Unit), or by an ASIC (Application Specific Integrated Circuit).

The steps in the method of the implementation of the present disclosure can be sequentially adjusted, merged, and subtracted according to actual needs.

The units in the terminal of the implementation of the present disclosure can be combined, divided, and deleted according to actual needs.

It will be understood by those of ordinary skill in the art that, implementation of all or part of the processes in the method of the implementations described above can be accomplished by a computer program to instruct the associated hardware; the computer program can be stored in a computer-readable storage medium and which, when executed, may include flows of respective methods of the implementations as described above. The storage medium can be a magnetic disk, an optical disk, a read-only memory (ROM), a random access memory (RAM), or the like.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method of accessing a network, comprising:
    accessing, by a mobile communication terminal, a wireless local area network of a place of visit;
    sending, by the mobile communication terminal, a network identity (ID) acquisition request to a network server of the wireless local area network;
    receiving, by the mobile communication terminal, at least one public land mobile network (PLMN) network ID unicast or broadcast by the network server in response to the network ID acquisition request, and adding the received at least one PLMN network ID to an equivalent home public land mobile network (EHPLMN) list, wherein the at least one PLMN network ID comprises network IDs of PLMNs of visited operators that have contracted with a home operator of the mobile communication terminal; and
    performing, by the mobile communication terminal, network access in the place of visit based on the EHPLMN list, wherein performing, by the mobile communication terminal, the network access at the place of visit based on the EHPLMN list comprises:
        searching, by the mobile communication terminal, for a public land mobile network of the place of visit (VPLMN);
        comparing, by the mobile communication terminal, network IDs included in the EHPLMN list against the network ID of the VPLMN; and
        when a network ID in the EHPLMN list matches the network ID of the VPLMN, initiating, by the mobile communication terminal, a network registration to the network corresponding to the matching network ID.

2. The method of claim 1, further comprising:
    storing in advance, by the mobile communication terminal, home of operators that have contracted with the home operator and IDs of the contracted operators;
    determining, by the mobile communication terminal, an ID of the visited operator contracted with the home operator, based on the place of visit, the pre-stored home of operators contracted with the home operator, and the IDs of the contracted operators; and
    wherein the network ID acquisition request sent by the mobile communication terminal to the network server of the wireless local area network carries the ID of the visited operator contracted with the home operator.

3. A method of accessing a network implemented by a network server, comprising:

receiving a network identity (ID) acquisition request from a first mobile communication terminal sent through a wireless local area network;

broadcasting the network ID acquisition request in the local area network when no public land mobile network (PLMN) network ID of a local operator has been stored;

receiving the PLMN network ID of the local operator sent from a second mobile communication terminal, the PLMN network ID of the local operator comprising a PLMN network ID of the local operator that has contracted with a home operator of the mobile communication terminal; and unicasting the PLMN network ID of the local operator to the first mobile communication terminal, or broadcasting the PLMN network ID of the local operator within the local area network, wherein the PLMN network ID of the local operator is used for network access of the first mobile communication terminal.

4. The method of claim 3, further comprising:
unicasting the PLMN network ID of the local operator to the first mobile communication terminal when the PLMN network ID of the local operator has been stored.

5. A mobile communication terminal, comprising:
a local area network access unit, configured to access a wireless local area network of a place of visit;
a requesting unit, configured to send a network identity (ID) acquisition request to a network server of the wireless local area network;
a receiving unit, configured to receive at least one public land mobile network (PLMN) network ID unicast or broadcast by the network server in response to the network ID acquisition request, and add the received at least one PLMN network ID to an equivalent home public land mobile network (EHPLMN) list, wherein the at least one PLMN network ID comprises network IDs of PLMNs of visited operators that have contracted with a home operator of the mobile communication terminal; and
a network access unit, configured to perform network access in the place of visit based on the EHPLMN list;
wherein the network access unit comprises:
a network searching sub-unit, configured to search for a public land mobile network of the place of visit (VPLMN);
a comparing sub-unit, configured to compare the network IDs included in the EHPLMN list against the network ID of the VPLMN; and
a network registration sub-unit, configured to, when a network ID in the EHPLMN list matches the network ID of the VPLMN, initiate a network registration onto the network corresponding to the matching network ID.

6. The mobile communication terminal of claim 5, further comprising:
a storage unit, configured to store, in advance, home of operators that have contracted with the home operator and IDs of the contracted operators;
a determining unit, configured to determine an ID of the visited operator contracted with the home operator, based on the place of visit, the pre-stored home of operators contracted with the home operator, and the IDs of the contracted operators; and
wherein the network ID acquisition request sent by the requesting unit to the network server of the wireless local area network carries the ID of the visited operator that has contracted with the home operator.

* * * * *